Aug. 5, 1930.   W. A. WALLACE ET AL   1,772,329
AGRICULTURAL IMPLEMENT HITCH AND CONTROL APPARATUS
Filed Feb. 24, 1925   2 Sheets-Sheet 1
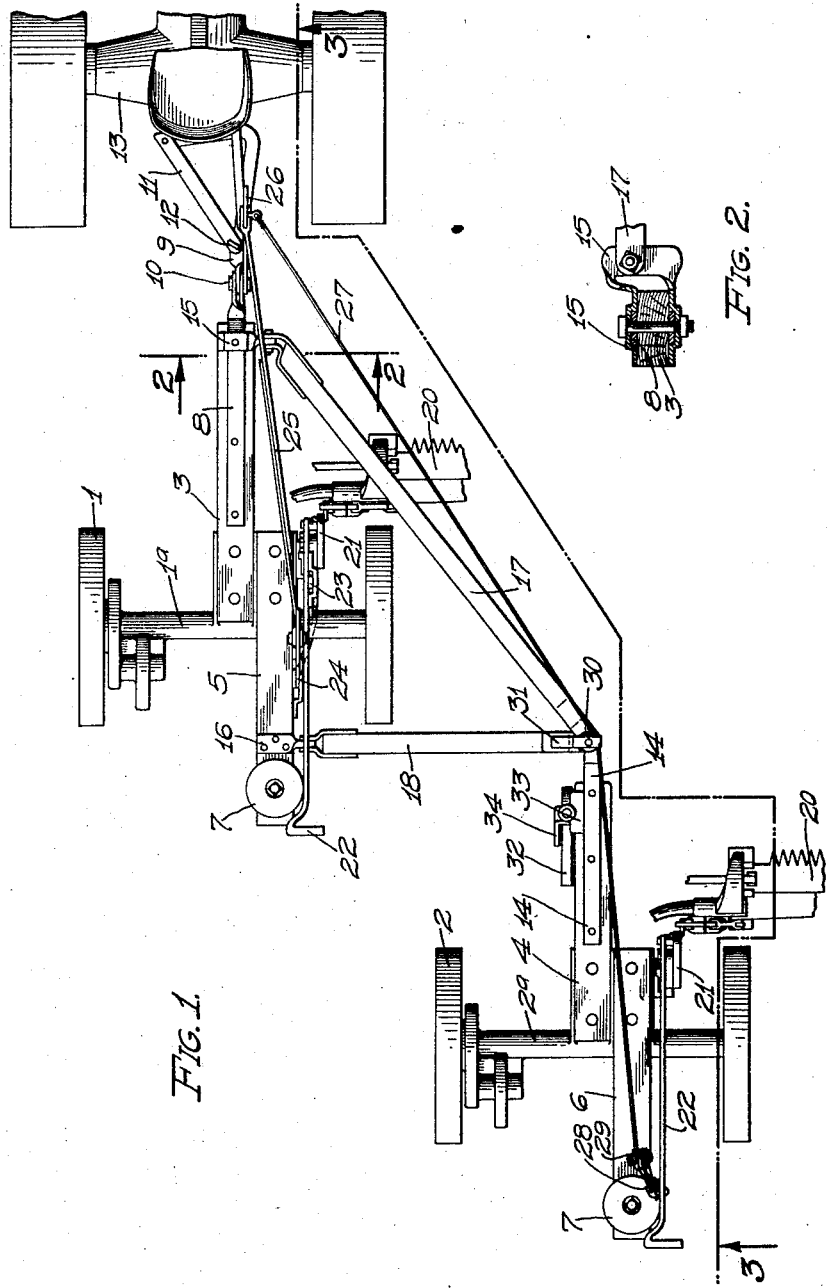
Inventors
WALTER A. WALLACE.
ARTHUR M. DOSSEY.
By A. B. Bowman
Attorney

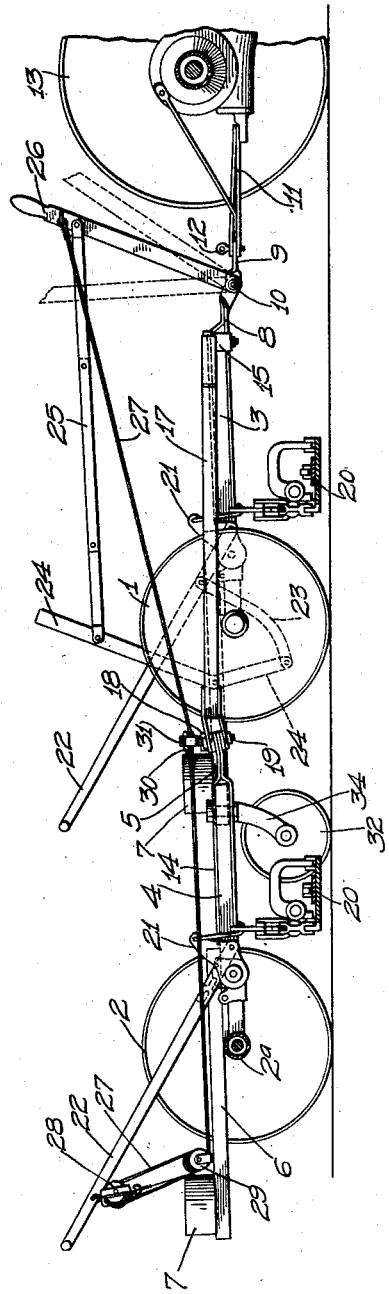

Patented Aug. 5, 1930

1,772,329

UNITED STATES PATENT OFFICE

WALTER A. WALLACE AND ARTHUR MATHUS DOSSEY, OF CALIPATRIA, CALIFORNIA

AGRICULTURAL IMPLEMENT HITCH AND CONTROL APPARATUS

Application filed February 24, 1925. Serial No. 11,072.

Our invention relates to agricultural implement control apparatus, particularly adapted for controlling the operation of agricultural implements from a tractor or other vehicle to which the implement is connected, and the objects of our invention are: first, to provide a control apparatus of this class whereby a plurality of agricultural implements may be connected to and drawn by a single tractor or other vehicle and the operations thereof controlled from said tractor or other vehicle; second, to provide a hitch means in connection with a control apparatus of this class whereby one mower or other agricultural implement may be connected to another in such a manner that the former may follow the other, to which it is connected, to one side, and whereby a substantially right angle or short turn may be made by the former relatively to and with the leading mower or other agricultural implement; third, to provide a control apparatus of this class whereby a pair of mowers or other agricultural implements, the one positioned behind and to one side of the other, may be effectively and separately controlled from the tractor or other vehicle drawing the same; fourth, to provide a control apparatus of this class in which the cutter bar of one mower connected behind a tractor or other vehicle is adapted to be raised and lowered by a lever means contiguous to the driver's seat of the tractor or other vehicle, and in which the cutter-bar of another mower connected behind and to one side of the former is adapted to be raised and lowered by cable means terminating at one end contiguous to the operator's seat; fifth, to provide a remote mower control apparatus in which the cutter-bar and cutter-bar raising lever of a mower, connected behind a tractor or other vehicle, is adapted to be shifted or controlled by a block and tackle means, controllable from the operator's seat of the tractor or other vehicle; sixth, to provide a novelly constructed and arranged hitch means for connecting a pair of agricultural implements together and to a tractor, and novelly constructed means for controlling the operable members of the agricultural implement, and seventh, to provide an apparatus of this class which is simple and economical of construction, durable, efficient, and which will not readily deteriorate or get out of order.

With these and other objects in view, as will appear hereinafter, our invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a plan view of our apparatus connecting a pair of mowers in staggered relation to each other and to a tractor, showing the tractor and mowers fragmentarily; Fig. 2 is a transverse sectional view thereof, taken through 2—2 of Fig. 1, showing one of the pivotal connections of the hitch means, connecting the one mower behind and to one side of the other, with the draw-bar of the other, and Fig. 3 is a side elevational view thereof, taken at 3—3 of Fig. 1, showing certain parts and portions broken away and in section to facilitate the illustration, and showing fragmentarily by dotted lines the operating lever in several shifted positions.

Like characters of reference refer to similar parts and portions throughout the several views of the drawings.

The agricultural implements 1 and 2, shown in the drawings, are McCormick Number Six mowers, but, it will be noted, that our hitch and control apparatus is not limited to this particular type of mower or to the particular type of agricultural implement, as will be apparent in the following description.

The frames 1ª and 2ª of the mowers 1 and 2 are provided with forwardly extending portions to which, respectively, draft members 3 and 4 are conventionally secured. These forwardly extending portions are so constructed that the draft members may be secured to the frames of the mowers at substantially the median lines thereof or to one side, the positions of the draft members 3 and 4 relatively to the mowers 1 and 2 being substantially on the median lines thereof. To the forwardly extending portions of the frames of said mowers are also secured the forward ends of the counterbalance members 5 and 6, which extend backwardly therefrom over the axles and are provided at their rear ends with weights 7 which are adapted to counterbalance the mowers in place of the operators when the mowers are connected with a tractor, under which condition the services of operators are dispensed with. The counterbalance members 5 and 6 are preferably positioned at the one sides of the draft members and raised from the bottoms of the recesses formed in the forwardly extending portions of the frames of the mowers, preferably by means of blocks.

The draft members 3 and 4, being preferably made of wood, are bound at their upper and lower sides with iron straps 8 and 14, respectively. The straps 8 are twisted at their front ends and connected, by means of a bolt 10, positioned horizontally, to a link 9. The link 9 is pivotally connected at its forward end, by means of an eye or other similar bolt, positioned vertically, to the normally rear end of the triangularly shaped hitch member 11 which is secured to the rear end of a tractor 13. The link 9, being connected to the hitch member 11 and the straps 8 of the draft member 3, as stated, provides a universal joint between the tractor and the mower connected therewith.

Near the forward end of the draft member 3, and also near the rear end of the counterbalance member 5, are secured brackets 15 and 16, respectively, which extend to the normally righthand side of said members. To the bracket 15 is pivotally connected the normally forward end of the hitch beam 17; and to the bracket 16 is pivotally connected the one end of the hitch beam 18, which beams are pivotally connected at their opposite or outer ends with each other and with the normally forward ends of the strap 14 of the draft member 4, by means of a bolt 19. Thus, a vertically tiltable triangular hitch means is formed in connection with the draft and counterbalance members of the mower 1 for drawing the mower 2 in staggered relation relatively to the former.

Each of the mowers is provided with a cutter-bar 20 which is pivotally supported at its one end on the frame of each mower. Said cutter-bars are pivotally connected, by means of levers and links, to the cutter-bar raising members 21, the cutter-bar 20 supported on the frame of the mower 1 extending to the right therefrom in front of the path of the following mower 2, and the cutter-bar 20, supported on the frame of the mower 2, also extending to the right from the latter mower, thus providing a relatively wide sweep of a cutter means for cutting hay and the like. The cutter-bar raising members 21 are pivotally mounted on the frames of the mowers, as shown best in Fig. 3. To these cutter-bar raising members 21 are pivotally connected the one ends of cutter-bar raising levers 22 which, in the conventional mowers mentioned, are provided with cutter-bar positioning cam pawls adapted to engage notched portions on quadrant members non-rotatably connected with the cutter-bar raising members 21, as shown by dotted lines in Fig. 3.

The lever 22 of the mower 1 is pivotally connected near its pivotal connection with the cutter-bar raising member 21, by means of a curved link 23, with the lower end of a lever 24 which is pivotally mounted intermediate its ends on the counterbalance member 5, as shown best in Fig. 3. Said lever 24 is pivotally connected near its upper end, by means of an adjustable link 25 near the upper free end of an operating lever 26 pivotally mounted at its lower end on the bolt 10, previously mentioned. The upper free end of the operating lever 26 is positioned in close proximity to the seat of the operator of the tractor so that the lever may be easily operated therefrom.

It will be noted that by pulling the operating lever 26 forwardly, the lever 22 is forced downwardly, raising the cutter-bar; and by forcing the lever 26 backwardly to the dotted line position, the cutter-bar is lowered, it being noted that the cam pawl, previously mentioned and adapted to hold the lever 22 of the mower 1 in position when the cutter-bar is raised to certain positions, is automatically released when the operating lever 26 is forced backwardly.

The cutter-bar raising lever 22 of the mower 2, being more remotely removed from the operator's seat of the tractor, is operated by a cable 27 secured at its one end, preferably, to the upper portion of the operating lever 26, so that the same may be conveniently reached by the operator. Near the free end of the lever 22 of the mower 2 is pivotally hung a double-sheave tackle-block 28, and near the rear end of the counterbalance member 6 is pivotally supported a triple-sheave block 29. The other end of the cable 27 is secured to a hook or loop portion at the lower end of the frame of the tackle-block 28. Said cable extends around the sheaves of the blocks 28 and 29 and around a sheave 30 revolubly mounted on a bracket 31 substantially over the pivotal connection of the strap 14 of the draft member 4 with the hitch beams 17 and 18, as shown.

Near the forward end of the draft member 4 of the mower 2 is provided a bracket 33 in which is rotatably mounted, on a vertical axis, the wheel support 34, at the lower bifurcated end of which is revolubly mounted the auxiliary supporting wheel 32.

It will be here noted that both draft members are inclined upwardly toward their front ends to tilt the mowers in approximately the position as when drawn by horses. To meet the rear end of the connecting link 9, the forward ends of the straps of the draft member 3 are bent downwardly, as shown in Fig. 3. The hitch beams 17 and 18 are pivotally connected near the upper sides of the draft member 3 and the counterbalance member 5, as shown best in Figs. 2 and 3. The straps 14 of the draft member 4 are bent upwardly at their forward ends to meet the pivotal connection of the hitch beams 17 and 18, which beams extend in a substantially horizontal plane from their connections with the mower 1.

It is obvious from this construction, as illustrated in the drawings and disclosed in the foregoing specification, that we have provided a hitch means for connecting one agricultural implement to another and to a tractor and an apparatus for controlling said implements from the operator's seat of the tractor, as aimed at and set forth in the objects of the invention, and though we have shown and described a particular construction, combination and arrangement of parts and portions, we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent is:

1. In a hitch and control apparatus, the combination with a tractor and a plurality of agricultural implements, of a hitch means detachably connecting one of said implements with said tractor, another hitch means pivotally connecting another of said implements slightly behind and to one side of the implement directly connected to said tractor, a lever means operable from the seat of said tractor and connected with the operating mechanism of the implement directly and detachably connected with said tractor, and a cable means also operable from the seat of said tractor and directly connected with the operating mechanism of said other implement, said lever and cable means being adapted to control the movements of said implements.

2. In an apparatus of the class described, the combination with a tractor and a pair of mowers having rearwardly extending counter-balance members, of hitch means detachably connecting one of said mowers to said tractor, a hitch beam secured at its one end to the rear end of said counterbalance member and extending to one side of said mower, and another hitch beam connected to the forward draft portion of said mower and extending diagonally toward the outer end of said first mentioned hitch beam, said other mower being pivotally connected at the forward end of its draft member with the connection of said hitch beams.

3. In an apparatus of the class described, the combination with a tractor and a pair of mowers having rearwardly extending counter-balance members, of hitch means detachably connecting one of said mowers to said tractor, a hitch beam secured at its one end to the rear end of said counterbalance member and extending to one side of said mower, another hitch beam connected to the forward draft portion of said mower and extending diagonally toward the outer end of said first mentioned hitch beam, said other mower being pivotally connected at the forward end of its draft member with the connection of said hitch beams, lever means connected with the cutter-bar raising lever of said first mentioned mower and positioned in such a manner relatively to said tractor as to be readily controlled by the operator thereof, and cable means connected with the cutter-bar raising lever of said other mower and secured at its one end in close proximity to the tractor as to be easily reached by the operator thereof for controlling said last mentioned mower.

4. In an apparatus of the class described, the combination with a tractor and a pair of mowers, of hitch means detachably connecting one of said mowers to said tractor, a hitch beam extending to one side of said mower at the rear portion thereof, another hitch beam connected to the forward draft portion of said mower and extending diagonally toward the outer end of said first mentioned hitch beam, said other mower being pivotally connected at the forward end of its draft member with the connection of said hitch beams, a block connected with the free end of the cutter-bar raising lever of said last mentioned mower, another block pivotally supported at the rear portion of said last mentioned mower by the frame thereof, and a cable extending around said blocks with one end secured in close proximity to said tractor in a manner as to be easily reached by the operator thereof.

5. In an apparatus of the class described, the combination with a tractor and a pair of mowers, of hitch means detachably connecting one of said mowers to said tractor, a hitch beam extending to one side of said mower at the rear portion thereof, another hitch beam connected to the forward draft portion of said mower and extending diagonally toward the outer end of said first mentioned hitch beam, said other mower being pivotally connected at the forward end of its draft member with the connection of said hitch beams, a block connected with the free end of the cutter-bar raising lever of said last mentioned mower, another block pivotally supported at the rear portion of said last mentioned mower by the frame thereof, a cable extending around said blocks with one end secured in close proximity to said tractor in a manner as to be easily reached by the operator thereof, and a sheave positioned at the pivotal connection of said last mentioned mower and said hitch means around which said cable extends.

In testimony whereof, we have hereunto set our hands at Calipatria, California, this 12th day of February, 1925.

WALTER A. WALLACE.
ARTHUR MATHUS DOSSEY.